Figure 1:
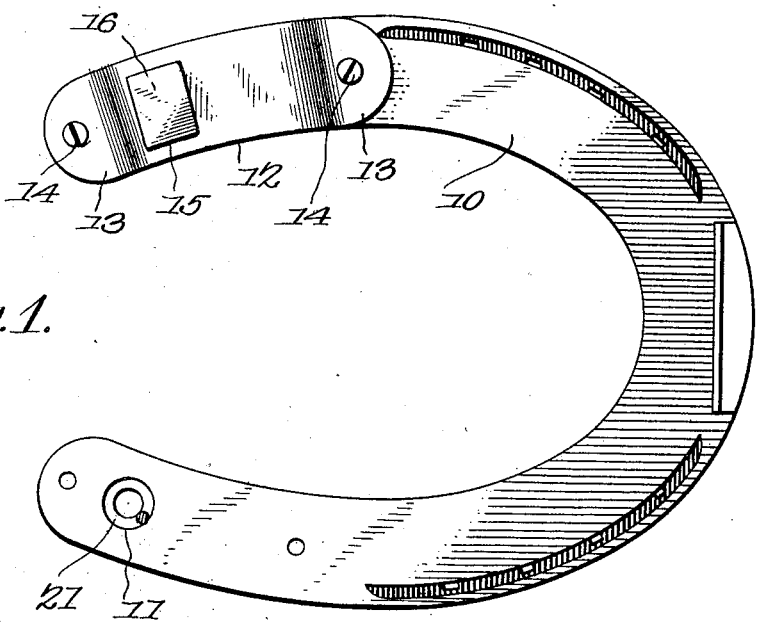

No. 763,669. PATENTED JUNE 28, 1904.
M. R. JACKSON.
HORSESHOE CALK.
APPLICATION FILED JAN. 11, 1904.
NO MODEL.

Witnesses
E. T. Stewart
C. N. Woodward.

Malery R. Jackson, Inventor.
by C. A. Snow & Co.
Attorneys

THE NORRIS PETERS CO., PHOTO-LITHO., WASHINGTON, D. C.

No. 763,669. Patented June 28, 1904.

UNITED STATES PATENT OFFICE.

MALERY R. JACKSON, OF TIPTON, IOWA.

HORSESHOE-CALK.

SPECIFICATION forming part of Letters Patent No. 763,669, dated June 28, 1904.

Application filed January 11, 1904. Serial No. 188,541. (No model.)

*To all whom it may concern:*

Be it known that I, MALERY R. JACKSON, a citizen of the United States, residing at Tipton, in the county of Cedar and State of Iowa, have invented a new and useful Horseshoe-Calk, of which the following is a specification.

This invention relates to horeshoes of the class having yieldable calks, and has for its object to improve the construction of such devices and produce an easily-applied attachment whereby the concussions arising from the impact of the horse's shoes with the pavement will be absorbed and prevented from being imparted to the feet and legs, improve the knee action, cause the horse to involuntarily lengthen his stride, prevent overreaching or "forging," and improve the gait generally.

With this and other objects in view, the nature of which will appear as the invention is better understood, the invention consists in certain novel features of construction, as hereinafter shown and described, and specified in the claims.

In the accompanying drawings, forming a part of this specification, and in which corresponding parts are denoted by like reference characters, is shown the preferred form of the embodiment of the invention capable of carrying the same into practical operation, it being understood that the invention is not necessarily limited thereto, as various changes as to shape, proportions, and modifications in other minor details may be resorted to without departing from the principle of the invention or sacrificing any of its advantages, and the right is therefore reserved of making all changes and modifications which may fairly fall within the scope of the invention and the claims made therefor.

Figures 2, 3:
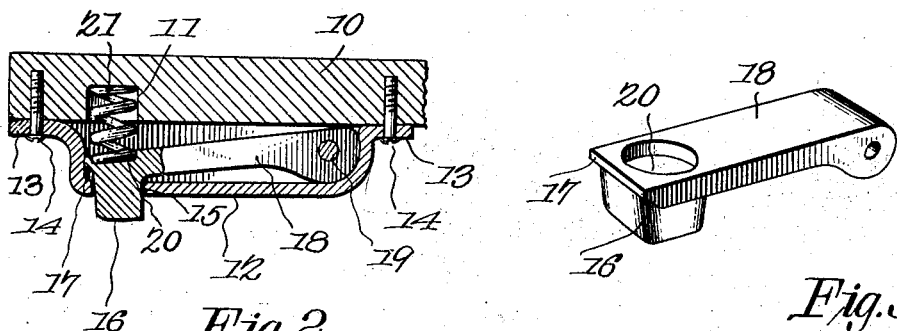

In the drawings thus employed, Figure 1 is an inverted plan view of a horseshoe with the improvement applied to one heel thereof, but not at the other. Fig. 2 is an enlarged sectional detail of the heel portion having the present device applied thereto. Fig. 3 is a perspective view of the "calk" detached.

The horseshoe 10 is provided with recesses 11 in the lower side of its heel portions, and attached to the heel portions are hollow casings 12, each casing having longitudinally-extended flanges 13, punctured for the holding screws or rivets 14, by which the casings are secured in position upon the horseshoe. The casings 12 are each provided with a downwardly-opening aperture 15 opposite the recess 11 and preferably near one end of the casing. Projecting through the apertures 15 are calks 16, having a shoulder 17 on one side and an elongated arm or bar 18 on the other side, the latter extending to the unapertured end of the casing and preferably connected movably therein by a transverse rivet 19. The inner surface of each of the calks 16 is provided with a recess 20, corresponding to the recess 11 in the shoe, and seated by its ends in each pair of these recesses is a spring 21, exerting its force to maintain the calk yieldably in its projected position. The springs are thus supported from lateral displacement by the recesses in which the ends are seated and will be of sufficient strength to withstand the strain and afford the requisite "cushioning" effect. The inner end of the bar 18 will preferably be enlarged and rounded to completely fill the interior of the casing, so that the strains will be borne by the body of the bar and not by the rivet 19, by which it is connected.

The calk member 16 will be of any desired shape and may be either "sharp" or "dull" to correspond to the condition of the pavement, and by connecting the casings to shoes by screws the calks can be very quickly changed when desired. Thus by furnishing duplicate sets of calks the shoes may be very quickly adapted to all kinds of weather or conditions of the pavement or roadway.

Having thus described my invention, what I claim is—

1. A horseshoe having a casing upon the under side thereof, an arm pivoted within the casing and having a calk working through the opening in the casing, and a spring to yieldably hold the calk projected through the opening in the casing.

2. A horseshoe having a casing upon the under side thereof, one end of the casing being interiorly rounded, the opposite end portion of the casing having an opening in the bottom thereof, an arm having one end pivoted within the rounded portion of the casing with said end shaped to have a working fit within the rounded portion of the casing to relieve strains from the pivot thereof, a calk carried by the free end of the arm and working through the opening in the casing, and a spring interposed between the arm and the shoe to yieldably hold the calk projected through the opening in the casing.

3. A calk attachment for horseshoes comprising a casing having flanges for connection with a horseshoe, one end of the casing being interiorly rounded and its opposite end having an opening in the bottom thereof, an arm pivoted within the rounded portion of the casing with its pivoted end shaped to have a working fit within said rounded portion of the casing, a calk carried by the free end of the arm and working through the opening in the casing, and a spring to yieldably hold the calk projected through the opening in the casing.

4. A horseshoe having hollow casings provided with longitudinally-extending flanges perforated for rivets or screws and by which means the casings are attachable to the horseshoe, said casings each having an outwardly-opening aperture near one end, calks projecting through said apertures and having lateral extensions into the unapertured portions of the casings and enlarged at the terminal to fill the casing, and springs between the calks and horseshoe, substantially as described.

5. A horseshoe having recesses in the rear ends, hollow casings attached to said horseshoe and having outwardly-opening apertures, calks projecting through said apertures and having lateral shoulders to prevent withdrawal from the casings, said calks having recesses opposite the recesses in the horseshoe, and springs each supported by its ends in said oppositely-disposed recesses.

In testimony that I claim the foregoing as my own I have hereto affixed my signature in the presence of two witnesses.

MALERY R. JACKSON.

Witnesses:
L. J. ROWELL,
M. M. FRANCE.